Aug. 8, 1961   J. H. COHEN   2,995,211
LUBRICATION SYSTEM
Filed Aug. 26, 1959
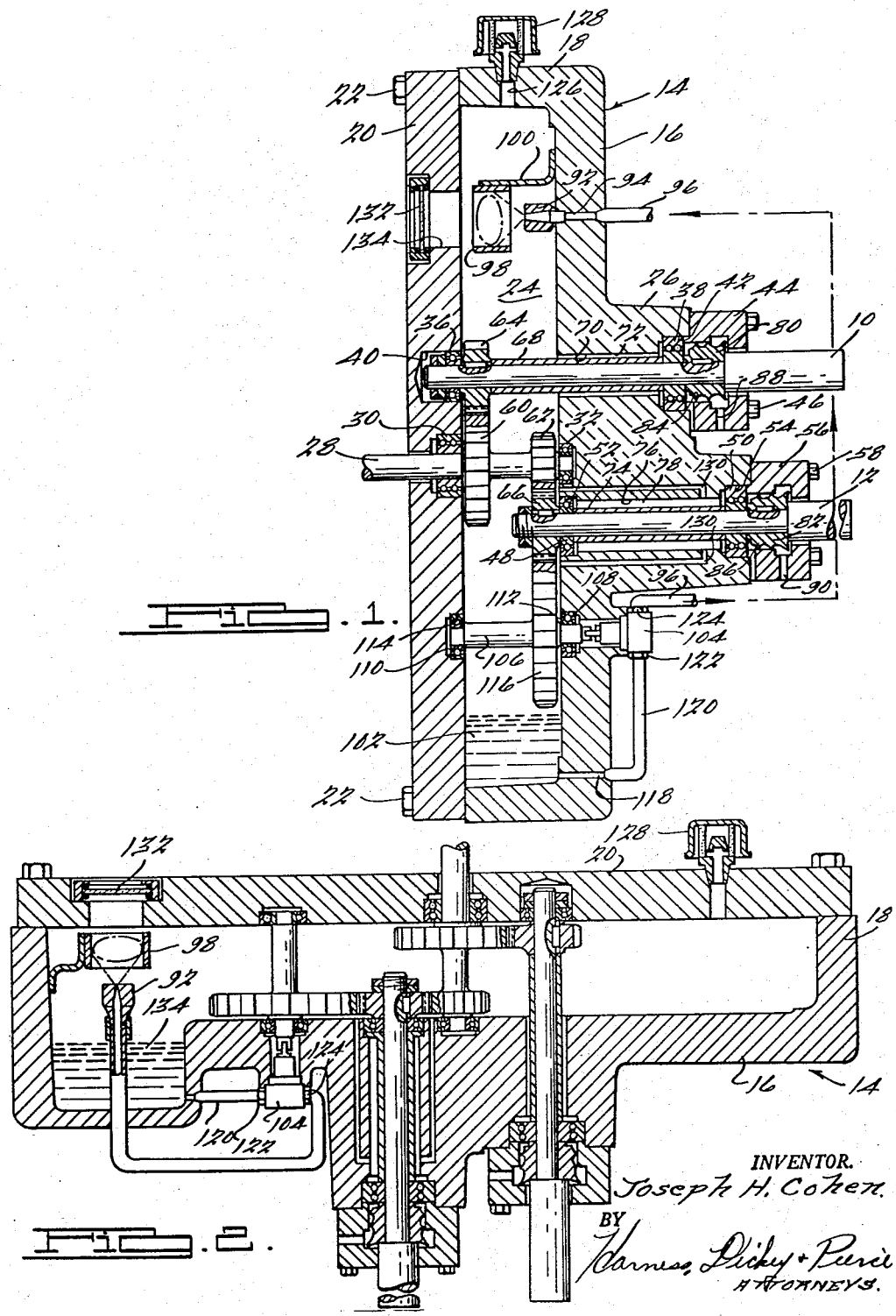
INVENTOR.
Joseph H. Cohen.
BY
Harness, Dickey & Pierce.
ATTORNEYS.

United States Patent Office 2,995,211
Patented Aug. 8, 1961

2,995,211
LUBRICATION SYSTEM
Joseph H. Cohen, Huntington Woods, Mich., assignor to The Cross Company, Fraser, Mich., a corporation of Michigan
Filed Aug. 26, 1959, Ser. No. 836,252
7 Claims. (Cl. 184—6)

This invention relates to new and useful improvements in lubrication systems.

Although the lubrication system of this invention has general utility and can be used to lubricate substantially any mechanism having reciprocating or rotating parts, it is primarily adapted and pre-eminently suited for lubricating machine tools and particularly, for lubricating multiple drill heads of the type used on substantially all types of machine tools. At the present time drill heads are lubricated in one of three ways.

One way of lubricating drill heads is simply to maintain a pool of oil in the head that is contacted by moving parts of the spindle drive mechanism. The oil is churned and agitated sufficiently during operation of the machine to splash lubricant on the various moving parts of the mechanism and the bearings which support these parts. This system is functionally adequate where the parts immersed or partially immersed in the lubricant create sufficient agitation or splash to reach all moving parts of the mechanism not normally in contact with the oil.

Another type of lubrication system frequently used in larger drill heads utilizes forced circulation of oil. Oil is taken from a sump in the lower part of the head and circulated through the portions of the head not normally covered by the oil.

A third system circulates the oil through the drill head on a compressed air stream which is forced through the head under considerable pressure.

The oil splash and forced circulation systems have the disadvantage of requiring oil seals wherever a shaft enters or leaves the housing, and they have the further disadvantage of generating considerable heat both from churning of the oil and by friction between the oil seals and the shafts sealed thereby. Also, the seals wear rapidly and oil leaks at the seals is a recurring problem requiring constant service and maintenance. The compressed air system has the disadvantage of being difficult to install in many instances and of creating a health problem to the machine operators and other persons in the vicinity of the machine. In the latter system, compressed air must be piped to all heads of the machine tool. The heads move constantly or intermittently in use and frequently are awkwardly positioned on the machine and are not readily accessible. This of course, complicates the air and lubricant connections to the heads and provides a maintenance and service problem. Further, in order to lubricate the heads properly in use, considerably more lubricant must be forced into the heads than is used; and, as a result, a considerable amount of lubricant leaves the head and contaminates the air in the vicinity of the machine tool.

An important object of the present invention is to provide a lubricating system that is or can be self contained in each drill head of the machine tool, that eliminates the need for connecting air hoses to the head from external sources, that eliminates the oil seal problem encountered in conventional systems, and that eliminates the heat generated by oil splash and by forced oil circulating systems.

Other objects and advantages of the invention will be apparent during the course of the following description.

In the drawing forming a part of this specification and wherein like numerals are employed to designate like parts throughout the same.

FIGURE 1 is a vertical sectional view showing a horizontal drill head equipped with the lubricating system of this invention wherein the system is self contained in the sense that all parts of the system are on and a part of the drill head, and FIG. 2 is a view similar to FIGURE 1 but showing the lubrication system of this invention adapted to a vertical drill head.

For a detailed description of the invention reference is first had to FIGURE 1 which shows a horizontal drill head having two drill spindles 10 and 12 carried by a housing 14. It will be readily appreciated in this connection, however, that two spindles are here shown merely by way of illustration. In practice, drill heads are made with varying numbers of spindles, and the instant invention is applicable to drill heads having any desired number of spindles.

Any suitable or conventional means (not shown) can be provided for mounting the housing 14 on the slide of a machine tool. The housing 14 has a front body portion 16 provided with a rearwardly extending peripheral flange 18 which seats against and is fastened to a cover 20 by screws 22. This construction provides an internal chamber 24 within the housing 14. The flange 18 is sealed in any suitable or conventional manner to the cover 20 to make the chamber 24 fluid tight. As shown in the drawing, the body 16 has an external embossment 26 which provides additional bearing support for the spindles 10 and 12.

A drive shaft 28 extends centrally through the cover 20 and is supported for rotation by bearings 30 and 32 recessed into the cover and body 16 respectively at opposite sides of the chamber 24. Any suitable or conventional drive (not shown) can be provided for the shaft 28. It conventionally is equipped with a driven pulley that is connected by a V-belt or the like to a driving pulley on a motor or drive shaft of the machine tool on which the housing 14 is mounted. Alternatively, the shaft 28 can, if desired, be coupled by a suitable flexible coupling directly to the drive shaft of a motor.

As suggested, the two spindles 10 and 12 extend into the chamber 24 through the embossment 26 and, as shown, they are disposed in laterally spaced parallel relation and on opposite sides of the drive shaft 28. The spindle 10 extends entirely through the chamber 24 and is supported for rotation by bearings 36 and 38. The rear bearing 36 is disposed in a recess 40 provided in the inner face of the cover 20 and the front bearing 38 is mounted in a recess 42 in the outer face of the embossment 26. Bearing 38 is held in the recess 42 by a retainer plate 44 which surrounds and loosely fits the spindle 10 and is fastened to the embossment 26 by screws 46. The spindle 12 extends into but not through the chamber 24 and is supported by inner and outer bearings 48 and 50. The inner bearing 48 is disposed in a recess 52 provided in the inner face of the body 16, and the front bearing 50 is mounted in a recess 54 provided in the outer face of the embossment 26. A bearing retainer plate 56 fastened to the embossment 26 by screws 58 holds the front bearing 50 in the recess 54.

The drive shaft 28 has two driving gears 60 and 62 in and at opposite sides of the chamber 24 and in engagement with respective driven gears 64 and 66 keyed or otherwise rotatably fixed on the spindles 10 and 12. The gears 60, 62, 64 and 66 may be different sizes as shown to drive the spindles 10 and 12 at different predetermined rotational speeds. However, it will be readily appreciated that the gear ratios of the drives to the respective spindles 10 and 12 may vary depending upon the exigencies of the particular situation.

A spacer sleeve 68 on the spindle 10 extends between the front bearing 38 and the driven gear 64, and the bore 70 of the embossment 26 through which the spacer 68 extends is of larger diameter than the spacer to provide an annular chamber 72 around the latter. As shown, the annular space 72 communicates at one end with the chamber 24 and at the other end with the recess 42 and bearing 38. A spacer sleeve 74 is similarly provided around the spindle 12 between the front bearing 50 and the rear bearing 48, and the bore 76 which receives the spacer 74 is of relatively large diameter to provide an annular space 78 around the spacer. As shown, the annular space 78 communicates at one end with the chamber 24 through the rear bearing 48 and at the other end thereof with the recess 54 and front bearing 50.

Coolant normally sprayed on the spindles 10 and 12 externally of the housing 14 is kept out of the housing by flingers 80 and 82 on and keyed to the spindle shafts within the annular bearing retainer plates 44 and 56. The flingers 80 and 82 here shown are conventional having spaced annular peripheral ribs or flanges 84 and 86 which collect coolant entering the bearing retainer plates 44 and 56 along the spindles and either throw it forwardly along the spindles or outwardly through radial vents 88 and 90 in the bearing retainer plates. In this connection, it will be observed that the bearing retainer plates 44 and 56 are spaced from the spindles 10 and 12 and from the flingers 80 and 86 so as not to interfere with rotation of the spindles, and this of course permits some coolant to flow rearwardly along the spindles. If desired, the front faces of the flinger ribs or flanges 84 and 86 may be dished or cupped slightly to assist in preventing rearward flow of the coolant and to assure that any coolant reaching the flanges is thrown forwardly and outwardly to the vents 88 and 90.

According to the present invention, lubricating oil is sprayed into the chamber 24 through a nozzle 92 that breaks the lubrication down into a very fine mist or fog. The nozzle 92 is mounted on the inner side of the body 16 and within the chamber 24 radially outwardly of the spindle 10, and lubricant is supplied to the nozzle through an opening 94 in the body 16 and a lubricant supply pipe 96 threaded in the body 16 at the outer end of the opening 94.

Lubricating oil injected into the chamber 24 passes through an annular baffle 98 supported in front of and concentric to the nozzle 92 by a bracket 100 mounted on the inner face of the body 16. As shown in the drawing, the baffle 98 is spaced from both the nozzle 92 and the rear cover 20. The fine lubricant fog passes through the baffle and into the chamber 24, but heavier lubricant particles impinge on and are collected by the baffle. These particles drip off of the baffle and fall by gravity into the lower portion of the housing 14 which serves as a sump or oil chamber 102. As shown, a quantity of oil normally is maintained in the bottom of the housing.

It is a feature of this invention that oil in the sump 102 is supplied to the nozzle 92 by a pump 104. As shown, the pump 104 is mounted on the outer face of the body 16 and is connected to and rotatably driven by a shaft 106 rotatably supported by bearings 108 and 110 mounted in confronting recesses 112 and 114 provided in the body 16 and cover 20 respectively. A gear 116 on the shaft 106 meshes with and is driven by the gear 66. Oil from the sump 102 passes through an opening 118 in the body 16 to a pipe 120 which leads to and connects with the inlet 122 of pump 104. The pipe 96 extends from the outlet 124 of the pump.

Thus, the drive shaft 28 acts through the gears 62, 66 and 116 to rotatably drive the pump 104 and the latter delivers oil under pressure to the nozzle 92 which sprays it into the chamber 24 in the form of a fine fog or mist. Heavier particles or droplets of lubricant are collected by the baffle 98 and returned to the sump 102 for recirculation. The lubricant fog or mist issues from the baffle and circulates through the head permeating all of the working parts exposed or communicating with the chamber 24. Circulation and movement of the lubricant mist within the drill head is promoted by the pumping action of the gears and bearings operating within the head. Also, movement of the lubricant mist throughout the housing 14 and to remote parts such as the front spindle bearings 38 and 50 in induced by a slight induced circulation of air through the chamber.

In connection with the foregoing, it will be noted that the flange 18 is provided with an inlet 126 through which air can enter the housing. A breather filter 128 cleans air entering the inlet 126 and prevents dirt and other contaminants from entering the housing with the incoming air. Rotation of the flingers 80 and 86 cause air around the flingers to move outwardly through the vents 88 and 90, and outflow of air induced in this manner by the flingers causes air and lubricant mist entrained therein to flow from the chamber 24 to the front spindle bearings 38 and 50 behind the flingers. In the case of the spindle 10, lubricant flows to the front bearing 38 through the annular space 72 which opens directly into the chamber 24 as shown. In the case of the other spindle 12, however, direct communication of the annular space 78 with the chamber 24 is at least partially blocked by the rear bearing 52. In this instance, bypass passages 130 are provided around the rear bearing 48. The inner ends of the passages 130 open directly into the chamber 24 radially outwardly of the bearing 48 and the outer ends thereof open directly into the annular space 78. Air and lubricant entrained therein pass relatively unobstructedly from the chamber 24 through the passages 130 to the front bearing 50. Thus, the bypass passages 130 serve the purpose of permitting a free flow of air and lubricant fog into the space 78 so that the pumping action of the rear spindle bearing 48 does not starve the front spindle bearing 50.

If desired, suitable filters (not shown) may be connected in the oil pipe 96 to remove dirt and other contaminants from the oil discharge by the pump 104 before it reaches the fog generating nozzle 92. A window 132 is mounted in an opening 134 in the cover 20 opposite the nozzle 92 and baffle 98 so that the injection of lubricant into the housing can be observed and checked.

The lubricating system of this invention has the advantage over conventional splash type systems in that none of the gears or bearings are submerged or in a pool of lubricating oil, and it therefore is not subject to heating due to churning of the lubricant as in the conventional systems. As a consequence, the spindle head runs cool compared to one having a splash type lubricating system.

The instant lubricating system also eliminates the need for spindle seals which are troublesome both from the point of creating heat from rotating friction and by wearing quickly to the point where they leak.

In addition, manifolding either within or outside the head is not necessary as only one nozzle is required in each head to generate the lubricant fog in sufficient quantities to lubricate the entire head.

The large piping and air supply equipment required by forced air-lubricant mist systems are not necessary and the space that would otherwise have to be allotted for their use can be put advantageously to other purposes. Further, the fog lubricant system of this invention eliminates the health hazard normally associated with forced air systems. The gentle flow and circulation of lubricant fog within the head induced by the pumping action of the gears and bearings and by circulation of air through the head due to air entering the inlet 126 and venting through the openings 88 and 90 assures adequate and continual wetting of the operating parts within the head. There is not significant or apparent loss of lubricant from the head.

Attention is now directed to FIG. 2 of the drawing which shows a vertical spindle head. This head is identical to the one shown in FIGURE 1 except that the head is oriented with the spindles disposed vertically rather than horizontally, and the head is adapted to travel vertically rather than horizontally. The change in position of the head requires some modification and adaptation of the various parts of the head and these changes and modifications will be described in detail. Other parts of the head which are identical or similar to the first form of the invention are not described in detail. Corresponding parts of the two heads are designated by the same reference numerals.

In this form of the invention the body 16 of the housing 14 is disposed at the under side of the head and it accordingly is specially formed to provide a sump 134 in which lubricant is collected and confined. The nozzle 92 extends upwardly through the sump 134 and the baffle 98 is mounted on the flange 18. The window 132 is of course provided in the top cover 20 opposite the nozzle 92 and the baffle 98 as in the first form of the invention. In the vertical drill head, the lubricant supply pipe 120 extends from the side of the sump 134 to the inlet 122 of pump 104 and the lubricant supply pipe 96 extends from the outlet 124 of the pump and upwardly through the bottom of sump 134 to the nozzle 92. The breather filter 128 in this instance is mounted in the cover 20 at the top of the housing 14.

With the exception of the structure hereinabove specifically described, the vertical drill head is identical in construction and operation to the horizontal drill head and it operates in the same manner to achieve the same beneficial results as the horizontal drill head.

What is claimed is:

1. In a lubrication system, a mechanism including rotatably driven parts, a housing for said mechanism, bearings supporting rotatable parts of the mechanism in said housing, means including an injection nozzle for introducing a lubricant mist into said housing, a baffle in front of said nozzle adapted to confine the lubricant mist ejected by said nozzle and to condense the coarser and heavier particles of said mist, an oil sump in the housing below said baffle for collecting oil condensed thereby, a pump driven by a rotating part of said mechanism, conduit means connecting the inlet of said pump to the sump below the normal level of oil therein for delivering lubricant from said sump to said pump, conduit means connecting the outlet of said pump to said nozzle for delivering lubricant under pressure from the pump to the nozzle, means for admitting air at substantially atmospheric pressure into the housing, and means for exhausting air from the housing comprising one of said rotatable parts and an air vent disposed radially outwardly from said one rotatable part, whereby air currents created in the housing by operation of said mechanism circulate about the moving parts of said mechanism and slowly from said inlet to said vent and whereby lubricant mist in the housing entrained in said air currents lubricates the parts of said mechanism and said bearings without appreciable loss of lubricant from said housing.

2. In a lubrication system, a housing, a rotary drive mechanism in said housing including a rotatable shaft extending through one wall of the housing and spaced inner and outer bearings supporting the shaft for rotation in said wall, means for injecting a lubricant mist into said housing, means for admitting air at substantially atmospheric pressure into said housing, means for exhausting air from the housing comprising a rotatably driven flinger on said shaft outwardly of said outer bearing and an air vent disposed radially outwardly from said flinger, operation of said mechanism creating air currents in said housing and inducing a slow movement of air from said inlet to said vent and said air currents carrying lubricant entrained therein to the moving parts of said mechanism and to said bearings, said mentioned wall of the housing having an annular space extending between said inner and outer bearings and bypass means communicating with said housing and said annular space for conducting said lubricant mist around said inner bearing and to said outer bearing.

3. In a lubrication system, a mechanism including rotatably driven parts, a housing for said mechanism, bearings supporting rotatable parts of the mechanism in said housing, means including an injection nozzle for introducing a lubricant mist into said housing, a baffle in front of said nozzle and spaced from the wall of the housing opposite said nozzle adapted to receive and confine the lubricant mist ejected by said nozzle and to condense the coarser and heavier particles of lubricant from said mist, means for admitting air at substantially atmospheric pressure into the housing, and means for exhausting air from the housing comprising a rotatable part of said mechanism and an air vent disposed radially outwardly from said one rotatable part whereby air currents are created in the housing by operation of said mechanism which move about the rotating parts of said mechanism and said bearings and slowly from said inlet to said vent and whereby lubricant mist in the housing entrained in said air currents lubricate the parts of said mechanism and said bearings without appreciable loss of lubricant from said housing.

4. In a lubrication system, a mechanism including rotatably driven parts, a housing for said mechanism, bearings supporting the rotatable parts of said mechanism in said housing, means including an injection nozzle for introducing a lubricant mist into said housing, baffle means in front of said nozzle for condensing the coarser and heavier lubricant particles from said mist, means for admitting air at substantially atmospheric pressure into the housing, and means for exhausting air from the housing comprising a rotatable part of said mechanism and an air vent disposed radially outwardly from said rotating part, whereby air currents are created in the housing by operation of said mechanism which circulate about the rotating parts of said mechanism and slowly from said inlet to said vent and whereby lubricant mist in the housing entrained in said air currents lubricates the part of said mechanism and said bearings without appreciable loss of lubricant from said housing.

5. In a lubrication system, a mechanism including a rotatably driven part, a housing for said mechanism, bearings supporting said rotatable part in said housing, means for providing a lubricant mist in said housing, means for admitting air at substantially atmospheric pressure into the housing, and means for exhausting air from the housing comprising an air vent disposed radially outwardly from said rotating part, whereby air currents are created in the housing by operation of said mechanism which circulate about the parts of said mechanism and slowly from said inlet to said vent and whereby lubricant mist in the housing is entrained in said air currents to lubricate the parts of said mechanism and said bearings without appreciable loss of lubricant from the housing.

6. In a lubrication system, a mechanism including movable parts, a housing for said mechanism, bearings supporting said movable parts in said housing, means for producing a lubricant mist in said housing, an air vent for exhausting air from the housing, said mist-producing means and said air vent being on opposite sides of bearings to be lubricated and said moving parts including means on the side of said bearings opposite from said mist-producing means and in proximity to said air vent operative to induce a pumping action in said housing, whereby air currents created in the housing as a result of pumping action induced by operation of said moving parts and said means circulate said mist through the housing and into contact with said bearings and said parts to lubricate the same, and means for collecting oil in the housing not in the form of mist so that said bearings are lubricated substantially entirely by the mist and whereby lubrication is effected without appreciable loss of lubricant from the housing.

7. In a lubrication system, a mechanism including movable parts, a housing for said mechanism, bearings supporting said movable parts in said housing, means for producing a lubricant mist in said housing, an air vent for exhausting air from the housing, said mist-producing means and said air vent being on opposite sides of bearings to be lubricated and said moving parts including means on the side of said bearings opposite from said mist-producing means and in proximity to said air vent operative to induce a pumping action in said housing, whereby air currents created in the housing as a result of pumping action induced by operation of said moving parts and said means circulate said mist throughout the housing and into contact with said bearings and said parts to lubricate the same, and baffling means in the housing arranged in the path of travel of oil particles in the housing for condensing coarser and heavier lubricant particles from said mist so that substantially only lubricant mist contacts said bearings and said moving parts whereby lubrication of the said bearings and said parts is effected without appreciable loss of lubricant from the housing.

References Cited in the file of this patent

UNITED STATES PATENTS

| | | |
|---|---|---|
| 2,379,944 | Willmott | July 10, 1945 |
| 2,531,411 | Davenport | Nov. 28, 1950 |
| 2,609,674 | Groat | Sept. 9, 1952 |
| 2,740,267 | Bayard | Apr. 3, 1956 |
| 2,762,664 | Manning et al. | Sept. 11, 1956 |
| 2,841,244 | Sorem | July 1, 1958 |
| 2,917,132 | Thomas | Dec. 15, 1959 |

FOREIGN PATENTS

| | | |
|---|---|---|
| 768,240 | Great Britain | Feb. 13, 1957 |